United States Patent
Balchandran et al.

(10) Patent No.: US 9,104,287 B2
(45) Date of Patent: Aug. 11, 2015

(54) SYSTEM AND METHOD FOR DATA COLLECTION INTERFACE CREATION AND DATA COLLECTION ADMINISTRATION

(75) Inventors: Rajesh Balchandran, Congers, NY (US); Ilya Skuratovsky, Stamford, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 2293 days.

(21) Appl. No.: 11/260,102

(22) Filed: Oct. 27, 2005

(65) Prior Publication Data
US 2007/0168578 A1    Jul. 19, 2007

(51) Int. Cl.
G06F 3/048    (2013.01)
G06F 17/30    (2006.01)
G06Q 30/02    (2012.01)

(52) U.S. Cl.
CPC .......... *G06F 3/048* (2013.01); *G06F 17/30905* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 5,450,538 A | 9/1995 | Glaser et al. | |
| 5,544,299 A | 8/1996 | Wenstrand et al. | |
| 6,662,157 B1 | 12/2003 | Horowitz | |
| 6,727,921 B1 | 4/2004 | Valad | |
| 6,865,578 B2 * | 3/2005 | Hays | 1/1 |
| 6,867,789 B1 | 3/2005 | Allen et al. | |
| 2002/0070980 A1 | 6/2002 | Le et al. | |
| 2003/0172193 A1 | 9/2003 | Olsen | |
| 2004/0064318 A1 | 4/2004 | Niemoeller et al. | |
| 2004/0230914 A1 | 11/2004 | Arend et al. | |
| 2005/0071753 A1 | 3/2005 | Klein et al. | |

FOREIGN PATENT DOCUMENTS

EP    1158444    11/2001

OTHER PUBLICATIONS

Nichols, Jeffrey, Brad A. Myers, and Kevin Litwack. "Improving Automatic Interface Generation with Smart Templates." Proceedings of the 9th International Conference on Intelligent User Interfaces. New York: 2004. 286-288. Print.*

* cited by examiner

*Primary Examiner* — William Brockington, III
(74) *Attorney, Agent, or Firm* — Patents on Demand P.A.; Brian K. Buchheit; Scott M. Garrett

(57) ABSTRACT

A method for collecting data for statistical modeling purposes can include the step of selecting at least one user interface type from a plurality of previously defined user interface types. Parameters of the selected interface type can be defined for a particular data collection instance. Target participant data can be inputted. A data collection interface based upon the selected interface type and defined parameters can be deployed. Messages can be automatically conveyed to data providers selected in accordance with the target participant data. The data providers can be permitted to access the deployed data collection interface. Data provided by the data providers can be automatically stored and used for statistical modeling purposes related to the data collection instance.

5 Claims, 6 Drawing Sheets

SYSTEM AND METHOD FOR DATA COLLECTION INTERFACE CREATION AND DATA COLLECTION ADMINISTRATION

BACKGROUND

1. Field of the Invention

The present invention relates to the field of data collection and, more particularly, to a system and method for data collection interface creation and the administration of a data collection effort.

2. Description of the Related Art

A variety of circumstances exist where it is desirable to obtain data from a population sample. For example, targeted data collection from a multitude of respondents is necessary for research surveys, markup forecasts, political opinion polls, and the like. Collecting a data sample is also necessary when building a statistical model, such as a statistical model used to construct a software application program. Many software applications are designed to receive user input, convert this input into a computer understandable form, and then to execute programmatic functions based upon the converted input. Software applications having this functionality include, but are not limited to, natural language understanding (NLU) applications, automated speech recognition (ASR) applications, and Interactive Voice Response (IVR) applications. These applications require relatively large amounts of sample or test data to build a realistic user response profile.

Even though data collection efforts are common, existing methods to develop and administer a data collection effort are technologically primitive and conducted in an ad-hoc manner. One existing method generates and conveys paper data response instruments to participants using postal mail. Responses are received via postal mail and converted into a digital format, which is analyzed and otherwise processed. This method is costly, is difficult to perform rapidly, and is subject to response and transcription errors. Further, this manual data collection process fails to utilize a set of standardized data collection instruments. Consequently, each data collection effort is treated in a unique fashion, each varying in format, form, and quality.

A modification of the pure paper data collection method is to e-mail electronic versions of a data collection instrument to a group of potential respondents. Respondents can e-mail back responses, often responding by textually adding their answers to prompts. This process suffers from the same shortcomings of purely paper collection efforts, except that the cost and time of mailing instruments through postal channels are eliminated. E-mail based data collection efforts suffer from additional security shortcomings as it is relatively easy to purposefully bias a data collection instance by generating multiple responses that appear to originate from multiple e-mail recipients, but are actually generated from the same data biasing sources.

A derivative of the e-mail collection approach is to include special markers within the sent e-mail to automate the data extraction process. Unfortunately, different e-mail systems can handle these markers in a non-uniform manner; causing some e-mail systems to incorrectly display the data collection instrument; and causing other e-mail systems to modify the markers in a way that foils the automatic extraction process.

Other existing approaches use customized data collection applications, which can be word processing documents with data gathering macros, data base applications, and/or completely customized software applications. In all of these cases, developers must come up with data collection scenarios from scratch. Because of the time and design effort involved, most of the developed data collection scenarios tend to be overly simplistic. Making more sophisticated scenarios to procure more realistic data requires significant development effort, skill, and time on the part of the developer. Additionally, respondents are forced to utilize a non-standard interface that is different from other data procurement interfaces that respondents have used in the past, which can increase a non-response ratio for the data collection instance.

Regardless of the exact method used, existing data collection methodologies fail to integrate the interface creation process with data collection tools, logistics tools, and/or analysis tools. There is a need for a configurable framework for performing data collection that can be readily adapted across domains. This framework would ideally require minimal manual processing and would streamline the data collection process from interface creation to data analysis.

SUMMARY OF THE INVENTION

A system and method for designing and administrating data collection instances in accordance with an embodiment of the inventive arrangements disclosed herein. More specifically, the present invention provides a data collection solution that encompasses the entire lifecycle involved in initializing and administering a data collection instance. The data collection solution includes an interface design server, which an interface designer can utilize to automatically generate a data collection interface. The data collection interface can be based upon a designer selected interface template and instance specific interface parameters.

The interface designer can specify a set of users or respondents that are to be presented with the data collection interface. The interface and respondent data can be conveyed to a deployment server. The deployment server can convey a message to the designated respondents informing them that their participation in a data collection instance is requested. Interested respondents can log onto the deployment server and access the data collection interface. Input from the respondents can be stored at a previously designated data space. This data can be automatically analyzed and statistical models, application test data, and/or reports can be automatically generated.

The present invention can be implemented in accordance with numerous aspects consistent with material presented herein. For example, one aspect of the present invention includes an interface creation system for creating interfaces customized for data collection instances. The system can include an interface design server, a deployment server and a data store. The interface design server can automatically generate data collection interfaces for data collection instances based upon designer provided parameters. The deployment server can serve data collection interfaces generated by the interface design server to remotely located data providers over a network connection. The data store can be used to automatically store data provided by the data providers. The stored data can be automatically analyzed. The analyzed data can be provided to a data collection agent.

Another aspect of the present invention can include a computerized system for collecting data from respondents. The system can include an interface creation application and a deployment server. The interface creation application can include one or more interface types. Each interface type can be associated with one or more configurable parameters. The interface creation application can automatically generate data collection interfaces based upon a selected one of the interface types and values of the configurable parameters. The deployment server can host the automatically generated data collection interfaces, can automatically convey messages to a defined set of data providers, can grant the data providers access to the data collection interfaces, and can store data provided by the data providers. The stored data can be automatically analyzed. Data collection results can be automatically generated based upon the analyzed data.

Still another aspect of the present invention can include a method for collecting data for statistical modeling purposes. The method can include a step of selecting at least one user interface type from a plurality of previously defined user interface types. Parameters of the selected interface type can be defined for a particular data collection instance. Information about potential/target participants can be inputted. A data collection interface based upon the selected interface type and defined parameters can be deployed. Messages can be automatically conveyed to data providers selected in accordance with the previously inputted participant data. The data providers can be permitted to access the deployed data collection interface. Data provided by the data providers can be automatically stored and used for statistical modeling purposes related to the data collection instance.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can be a method performed at least in part by a service agent and/or a machine manipulated by a service agent in response to a service request. For example, as part of deploying a data collection system for a customer, a service agent can install and configure suitable files upon a server so that the customer can thereafter utilize an interface design application deployed within the server.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
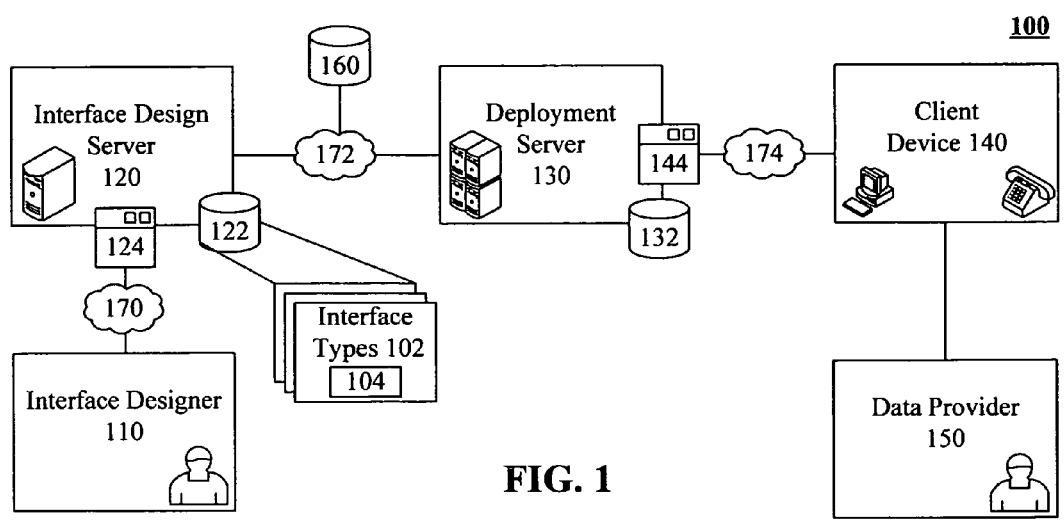
FIG. 1 is a schematic diagram of a system for designing interfaces for data collection instances and the administration of the same in accordance with an embodiment of the inventive arrangements disclosed here.

FIG. 1 is a schematic diagram of a system 100 for designing interfaces for data collection instances and the administration of the same in accordance with an embodiment of the inventive arrangements disclosed here. System 100 can be generally applied to any of a variety of surveying situations. In one embodiment, system 100 can be used to obtain training data used when building statistical models. In another embodiment, system 100 can be used for polling/marketing purposes. The surveying and/or data collection process described herein can be conducted over the phone, Web, e-mail, postal mail, and any combination thereof.

For example, system 100 can be used to develop a survey instrument or a data collection interface. The developed instrument or interface can be deployed within a Web server that is remotely accessible via a Web browser. The survey instrument or interface can also be deployed in a voice server that is accessible via a phone connection. Desired respondents can be contacted via e-email, phone, and/or other channels. Respondents can access the survey instrument or interface and provide data for various scenarios specified therein. Respondent provided data can be automatically processed and/or analyzed.

System 100 can include an interface design server 120, a deployment server 130, and a client device 140. The interface design server 120 can be a computing device or series of distributed computing devices upon which interface design application 124 resides. An interface designer 110 can be a person, entity, or group of authorized people that are authorized to use the interface design application 124. Interface designers 110 can access the interface design server 120 locally and/or can remotely access the interface design server via network 170. The interface design server 120 can include a data store 122 that contains several different interface types 102. Each of the interface types 102 can have interface type 102 specific parameter fields 104 associated with it. The interface designer 110 can use a "wizard" or other tools of the interface design application 124 to build a data collection interface 144 based upon a designer 110 selected interface type 102 and designer 110 provided interface parameters for the parameter fields 104.

A set or palette of interface types 102 can be used to facilitate the development of data collection interfaces 144, each developed data collection interface 144 can present prompts or scenarios to respondents and can receive respondent input. Interface types 102 can include, but are not limited to, a regular Web interface type, a Web interface type with embedded Web page, a Web interface type with a uniform resource locator (URL) input field, a speech user interface type, a multi-modal interface type, and a custom interface type.

Figure 3:
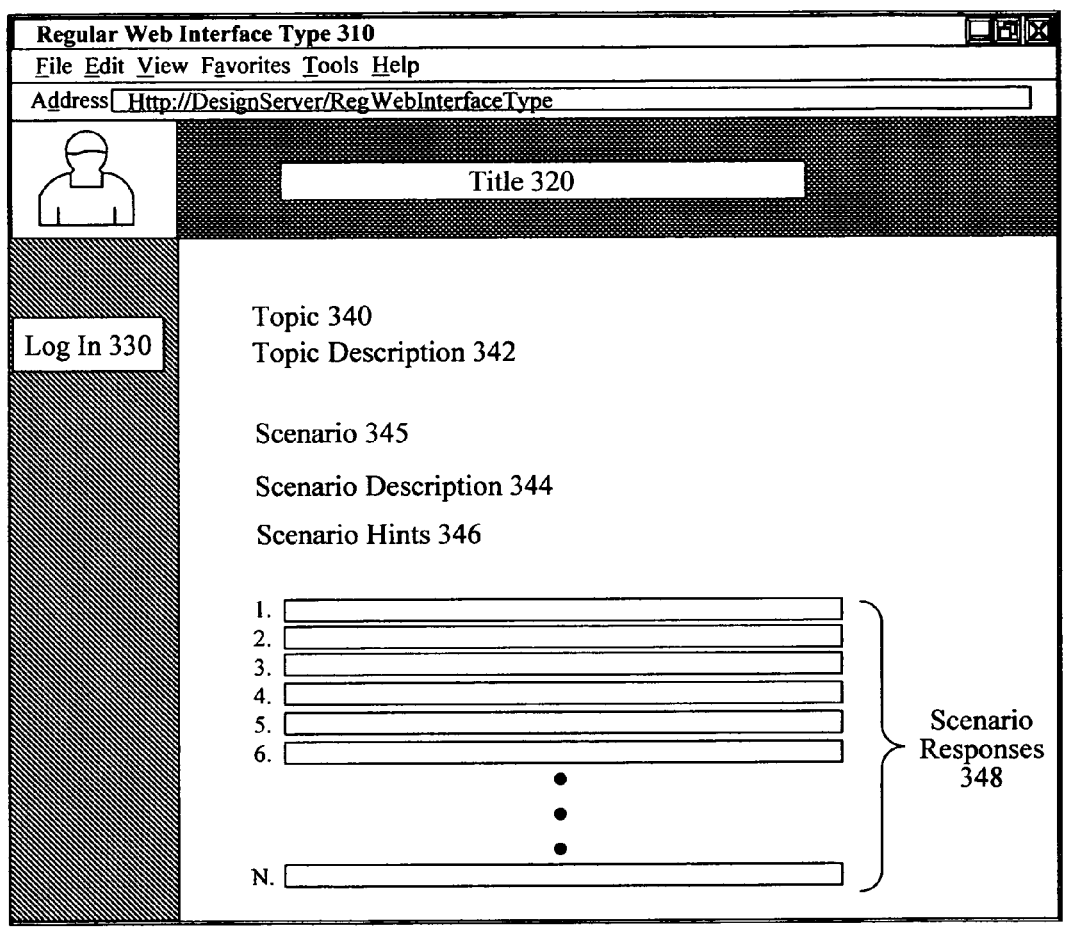
FIG. 3 is an illustrative graphical user interface (GUI) of a regular Web interface type in accordance with an embodiment of the inventive arrangements disclosed herein.

The regular Web interface type can include a Web based interface that describes one or more specific scenario using text, graphics, and/or multimedia Web elements. Optional examples can be included within the regular Web interface type that can be used to provide context and directions to data providers 150. The regular Web interface type can also include text input fields through which data is collected. FIG. 3 illustrates one potential arrangement for a regular Web interface type.

The Web interface type with an embedded Web page is similar to the regular interface type except that it includes an embedded Web page. The embedded Web page can present information extracted from Web sources that facilitate the data collection process. Content of the embedded Web pages can be dynamically changed based upon the scenarios presented. The interface designer 110 can designate which Web pages are to be placed within the embedded area and can specify criteria for presenting the pages. For example, the interface designer 110 can select different Web pages that illustrate an aspect of the current scenario for which the data provider 150 is providing input.

The regular Web interface with URL field type is similar to the regular interface type except that it includes an option for data providers 150 to input a URL in addition to providing normal text input. The URL can be associated with a textual response and can emphasize an aspect of the textual response. Options for providing multiple URLs for a single scenario response are also contemplated. This type of Web Interface can be considered effectively the opposite of the Web interface type with an embedded Web page in that a data provider 150 specifies applicable Web pages in the URL Web interface type and the interface designer 110 species applicable Web pages in the embedded Web page interface type. It should be appreciated that this interface type can be particularly helpful for data collection efforts relating to the Web where data providers 150 are familiar with and/or commonly utilize Web pages related to the data collection instance.

The speech user interface type is the type of interface used to support speech data collection. A speech user interface type audibly presents prompts to users and receives responses that include voice responses. Voice responses can be recorded and/or transcribed using speech recognition techniques. Configurable parameters can customize the speech user interface for use with a telephony interface or a desktop computer having an attached microphone. For example, when a telephony interface is used, the interface type can include elements that specifically support dual tone multi-frequency (DTMF) or dial pad input.

The multi-modal user interface type is used to collect data from a multi-modal device having more than one modality, such as a device having a GUI modality and a speech modality. Multi-modal interface types can be specifically configured to target particular multi-modal platforms, such as desktop computers, personal data assistants (PDAs), and smart phones. Each platform can have specific advantages and limitations. For example a GUI modality configured for a multi-modal desktop computer can have a larger visual area than a GUI modality configured for a multi-modal PDA.

The custom interface type can permit the interface designer 110 to extend the set of available interface types in accordance with his/her preferences. In one embodiment, custom interface types can include a standard interface type having one or more parameters specified. This custom type can be useful for interface designers 110 who are developing many interfaces, each having a large portion of common parameters. In another embodiment, custom interface types can be defined that combine elements of standard interface types. For example, a new interface type that is a regular Web interface with URL field and with Embedded Web pages can be defined.

The deployment server 130 can be communicatively linked to interface design server 120 via network 172. The deployment server 130 can be any server capable of serving data collection interfaces 144 to client devices 140 via network 174. For example, when the data collection interface 144 is a Web page, the deployment server 130 can include a Web server. In one embodiment, the data collection interface 144 can be a voice based interface and the deployment server 130 can be a voice server or voice response system.

In another embodiment, the deployment server 130 can be a JAVA 2 PLATFORM EDITION (J2EE) compliant application server, such as a WEBSPHERE application server from International Business Machines Corporation of Armonk, N.Y., a BEA WEBLOGIC application server from BEA Systems, Inc. of San Jose, Calif., a JBOSS application server from JBoss, Inc. of Atlanta, Ga., a JOnAS application server from the ObjectWeb Consortium, and the like. In such an embodiment, the interface design server 120 can package files that include the data collection interface 144 as an enterprise archive (EAR) file.

The deployment server 130 can include a data store 132 for storing data collection interfaces 144, interface parameters, interface responses, Web pages, Voice markup pages, media files, and server specific files. Data store 132 can store data on a temporary, on a semi-permanent, and/or on a permanent basis. The deployment server 130 can also store data within a networked data store 160, which may be accessible by an authorized interface designer 110.

One or more data providers 150 can use a client device 140 to access the data collection interface 144 deployed within the deployment server 130. Information providers 150 can be respondents that provide the input for a data collection instance. The client device 140 can include a computing device having a Web browser, a telephone, or any device appropriate for accessing the data collection interface 144.

Figure 2:
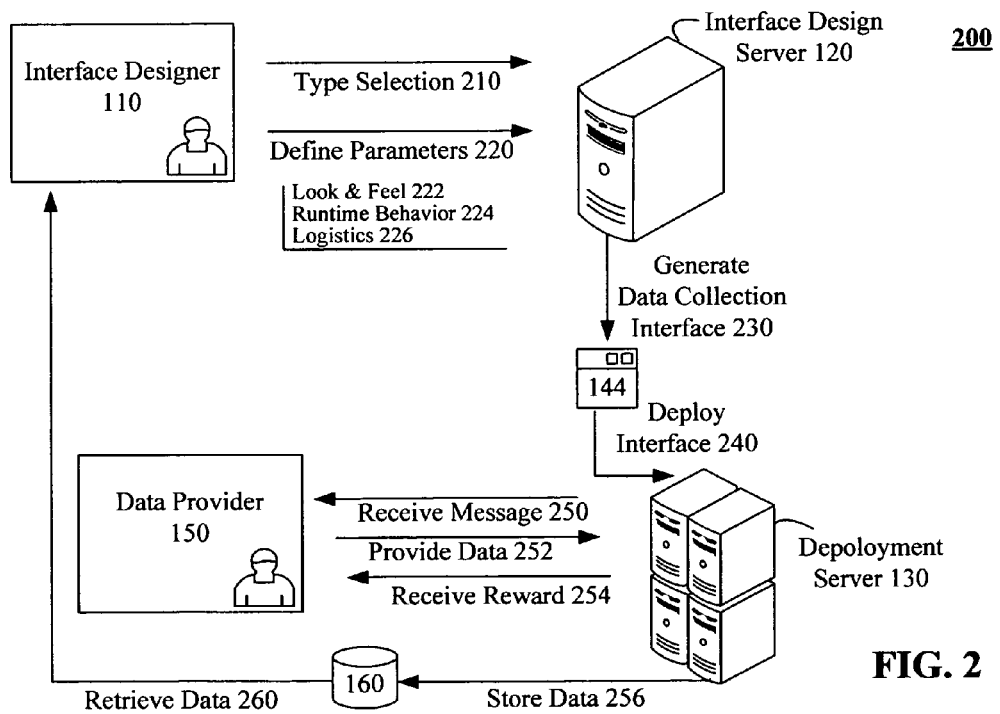
FIG. 2 is a process model of a system for designing interfaces for data collection instances and the administration of the same in accordance with an embodiment of the inventive arrangements disclosed herein.

FIG. 2 is a process model of a system 200 for designing interfaces for data collection instances and the administration of the same in accordance with an embodiment of the inventive arrangements disclosed herein. In system 200, interface designer 110 can select an interface type 210 using interface design server 120. Interface types include previously defined interfaces that are used as a template to construct a new interface to be used for data collection. Once an interface is selected, the interface designer 110 can define parameters 220 for the interface type to customize the interface for a particular data collection instance. The parameters can include providing responses to blank fields of the interface type, such as providing text for a data collection title, providing text for multiple scenarios within the data collection instances, and providing hints to assist a data provider 150 in responding to the scenarios. Additionally, parameters can define the look and feel 222 of the interface 144, the runtime behavior 224 of the interface 144, and the logistics 226 to be applied to collection tasks related to the interface 144.

Look and feel 222 parameters can specify graphical user interface (GUI) parameters and/or voice interface parameters, as appropriate for the selected interface type. GUI parameters can include color, interface size, font settings, text language, graphics to be displayed in graphic boxes, multimedia objects to be presented, toolbar and/or menu item presentation options, and other GUI properties. Voice interface parameters can include playback speed, gender, language, pitch, tone, and the like.

Runtime behavior 224 parameters can specify a number of required inputs per scenario, settings permitting/restricting participants to navigate between scenarios, input metric settings, feedback options, and error correction options. Input metric parameter settings can enable/disable the recordation of data entry metrics, such as the time that a respondent spends in providing input. Runtime feedback parameters can provide feedback to a current user regarding attempted data entries. Feedback can indicate, for example, that the user's responses are too short, too long, not understandable, or overly mimic the scenario prompts.

Error correction scheme parameters can enable/disable settings and can provide designer configurable fields related to the manner in which errors are to be handled within the data collection framework. Error correction parameters can establish whether errors are to be automatically corrected and/or whether a data provider 150 is to be notified when an error is detected.

As used herein, errors can include, but are not limited to, spelling errors, grammar errors, inconsistencies such as inconsistent use of upper and lower case, punctuations, etc., and other forms of non-desired input that are considered errors within a specific scenario. For example, desired responses for a particular scenario can include a string of characters as opposed to digits. The integrated error mechanism can either automatically perform digit to string conversions and/or can detect digit input and can upon detection can notify data provider 150 that digits are not preferred as input. In a different scenario, the opposite can be true and strings can be converted to digits and/or data provider can be notified that digits are preferred. In another example, abbreviations can be considered errors and the error mechanism can automatically expand abbreviations and/or provide notifications when abbreviations are detected.

Logistics 226 related parameters can specify a data space where respondent data is to be stored, can establish user registration/authorization settings, can specify a respondent contact mechanism (such as e-mail or phone), can establish respondent reward criteria, and the like. Logistics 226 based parameters can also define data collection participants, meaning that the logistics 226 parameters can specify a set of data providers 150 that are to provide input for the data collection instance.

Once the interface type and the interface parameters have been defined, the interface design server 120 can automatically generate 230 data collection interface 144 based upon the interface type and interface parameters. The data collection interface 144 can be deployed 240 to deployment server 130. The deployment server 130 can convey messages to each data provider 150 informing the data providers 150 that their participation in a data collection effort is desired. Common message conveyance forms include, but are not limited to, e-mail, telephone, and postal mail notifications. Data providers 150 that elect to participate in the data collection effort can log onto the deployment server 130 and can respond to the various scenarios presented within the data collection interface 144. That is, a data provider 150 can provide data 252 to the deployment server. The deployment server 130 can store provided data 256 within data store 160. The interface designer 110 can retrieve the data 260 from data store 160.

In one embodiment, data providers 150 can receive rewards 254 for their participation. That is, once data provider 150 has submitted enough data (as defined by the interface designer 110 when setting up the data collection interface 144), a software process for rewarding the data provider 150 can be initiated. For example, the coupon or reward credit can be automatically e-mailed to the data provider 150. Alternately, a data collection administrator can be conveyed a message indicating data provider 150 successfully provided data so that the administrator can provide a suitable participation reward.

FIG. 3 is an illustrative graphical user interface (GUI) 300 of a regular Web interface type in accordance with an embodiment of the inventive arrangements disclosed herein. GUI 300 depicts common elements that can be part of the regular Web interface type 310. It should be appreciated the GUI 300 is for illustrative purposes, and the regular Web interface type may not be renderable within a Web browser can may instead be in any digital format that is able to be utilized by interface design application 124.

GUI 300 can include a title 320 for the data collection instance. GUI 300 can include a log section 330 that permits a data provider to register before providing data. The log section 330 can also include elements for saving a particularly completed form.

GUI 300 can include a topic 340 and a topic description 342. The topic 340 can include a project name or other designator. The topic description 342 can include a brief description.

GUI 300 can further include one or more scenarios 345. A scenario 345 can be a prompt or a question for which information is solicited from a respondent. For each scenario 345, GUI 300 can include a description 344, a hint 346, and one or more scenario responses 348.

Figure 4:
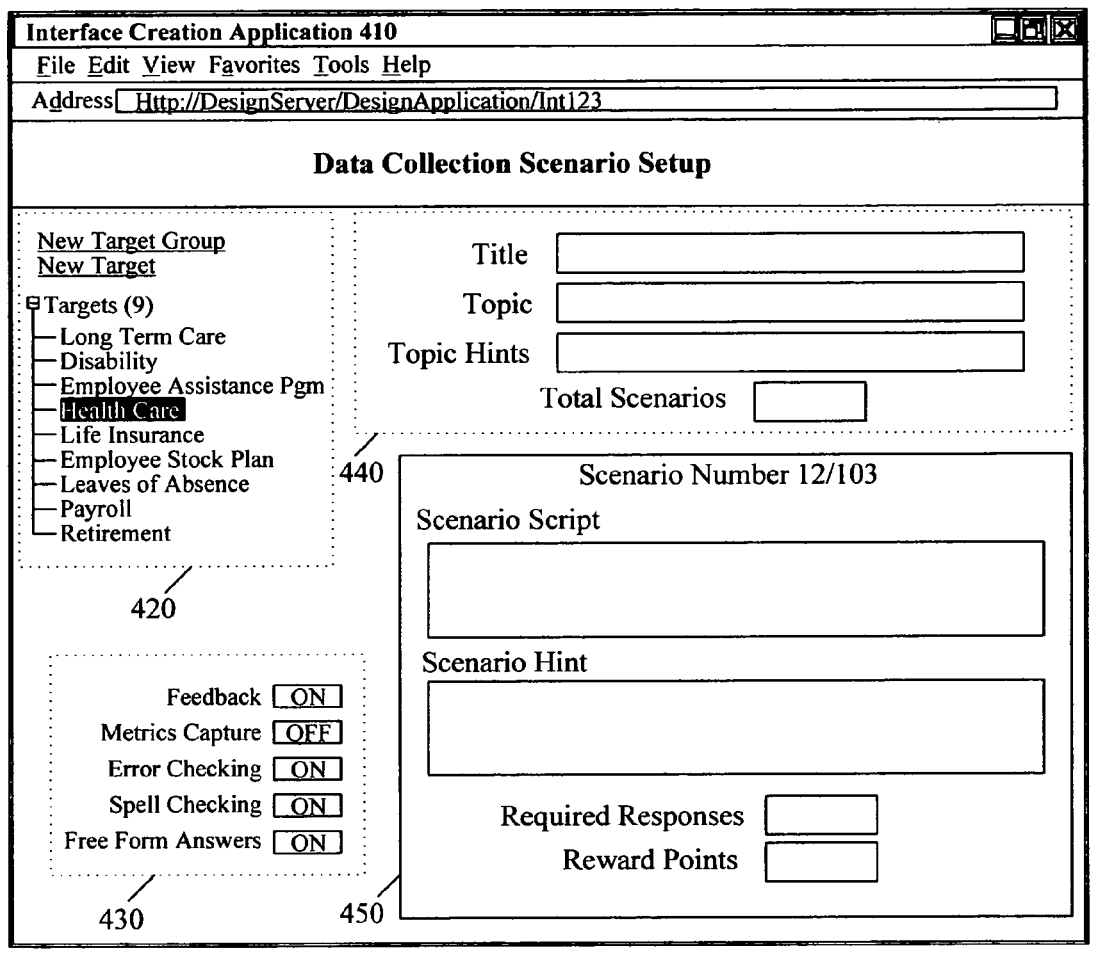
FIG. 4 is an illustrative graphical user interface (GUI) of an interface creation application in accordance with an embodiment of the inventive arrangements disclosed herein.

FIG. 4 is an illustrative graphical user interface (GUI) 400 of an interface creation application 410 in accordance with an embodiment of the inventive arrangements disclosed herein. The GUI 400 can be used by an interface designer to generate a data collection interface. GUI 400 can contain scenario forms like the ones shown in 440 & 450 consisting of fields for scenarios, examples, URLs, and the like. These scenario forms are defined in the selected data collection interface type. Scenario forms can be specific to the data collection interface type. Accordingly, a scenario form for Web based data collection can be different from one used for speech based data collection.

For example, section 450, which is used to populate scenario content, can be based upon a scenario form that is associated with the Web-based data collection interface type.

Section 450 shows a "Scenario Script" field and a "Scenario Hint" field that can represent content a particular scenario. For a user interface type, a scenario form can be defined as desired. For example, it could leave out the "Scenario Hint" field or add new fields. Fields are not limited to text and can contain Web link(s), media elements, embedded or attached electronic documents, one or more sample responses for a scenario, and the like, or references to these entities.

Further, the interface creation application 410 can provide a mechanism that specifies which scenarios are displayed to participants and in what order. For example, the set of scenarios for a participant and the sequence and flow between these scenarios can be orchestrated by customizable algorithms, scripts or configuration settings. Different sets of scenarios and scenario sequences can be defined for different data collection deployments. In one embodiment, user definable parameters can be provided to alter the sequence of scenarios. A designer can also define and utilize a designer developed or designer provided algorithm that sequences scenarios for a particular data collection instance.

In one embodiment, the sequence of scenarios and the mechanism for determining the same can conditionally and dynamically adjust the flow between scenarios based upon data provider responses. For example, a data provider response can indicate that he/she is single parent, which could result in the sequencing mechanism dynamically selecting one or more scenarios specific to single parents. In another example, audibly provided responses can indicate that a data provider is a non-native English speaker, causing the sequencing mechanism to prefer non-native English speaker specific scenarios over generally applicable ones. Additionally, speech processing parameters for the data collection instance can be dynamically adjusted to improve speech recognition accuracy.

In a particular embodiment, the interface creation application 410 can be accessed via a Web browser. The invention is not to be construed as limited in this regard, however, and the interface creation application 410 can be implemented as a software application executing upon a stand alone machine, can be implemented in a distributed fashion among many machines, and can be implemented in any other manner known in computer science.

The GUI 400 can be used to create generic or target specific scenarios. A target can refer to a topic or class in a statistical classification scheme. Target specific scenarios enable collected data to be automatically correlated to an associated topic or class. Therefore, an interface designer can utilize target specific scenarios to obtain pre-classified data. Thus, pre-classified data can be collected and automatically processed in accordance with the classifications defined via the target specific scenario.

In one embodiment, topically organized information based upon participant input can constitute training data for developing models for statistical classifiers. It should be appreciated that the invention is not restricted to data collection endeavors related to developing models based upon training data, but is instead broadly applicable to a variety of situations. That is, it is envisioned that the invention has applications beyond those for building statistical models, such as setting up scenarios for polling/market research over the phone, Web, etc. The present invention can be utilized in any survey situation to automate the survey process by facilitating the creation of a survey instrument and to automate data collection and data processing tasks.

When targeted data collection is desirable, GUI 400 can include a target section 420. Section 420 can include a tree or list structure comprising one or more targets, which can be used for topic based classifications. Section 420 can be interactively displayed so that the content author can associate scenario(s) with one or more targets in the list (420).

In one embodiment, a visual indicator (not shown) can indicate which targets have associated scenarios. As targets are associated with scenarios, section 420 can be dynamically updated as appropriate. The indication can assist a designer in constructing scenarios, as the designer may desire to construct a data collection instance to ensure that a minimum number of scenarios relate to each of the defined topics or targets.

For example, a designer can input content for scenario twelve within section 450. The designer can select one or more targets within section 420 that apply to scenario twelve. As illustrated, target groups can pre-classify scenarios as belonging to one or more of topics: long term care, disability, employee assistance program, health care, life insurance, employee stock plan, leaves of absence, payroll, and retirement. In the example, the designer can select disability and life insurance indicating that scenario twelve applies to the topics of disability and life insurance. An indicator following each scenario, such as a number, can be dynamically updated to reflect the change. Therefore if disability now is associated with three instead of two defined scenarios, a number following the disability target in section 420 can be updated from two to three.

In a different embodiment, a visual indicator can reflect whether a target in section 420 has any scenarios associated with it or not. For example, those targets associated with a scenario can be displayed in a black font, and those targets not yet associated with at least one scenario can be displayed in a red font. The visual indicator need not be a font or a number and any of a variety of other indicators, such as a highlight or a graphic, can be used. It should be appreciated that each scenario can apply to one or more target categories and that each target category can be associated with one or more scenarios.

Section 430 of GUI 400 illustrates some runtime parameters that can be specified for a particular scenario. Runtime parameters can include, but are not limited to, feedback, metric capture, error checking, spell checking, free form answers, and the like. Other parameters specific sections (not shown) can be included in GUI 400 for configuring look and feel parameters and for configuring logistics parameters.

Section 440 illustrates that title, topic, and topical hints can be defined for a data collection effort. The data collection effort can have any number of defined scenarios associated with it.

Section 450 illustrates that a designer can define a scenario script or description as well as a scenario hint for each scenario. A designer can also select the number of responses that are to be provided for each scenario and the number of reward points that are to be allocated to a data participant for responding to the scenario.

Figure 5:
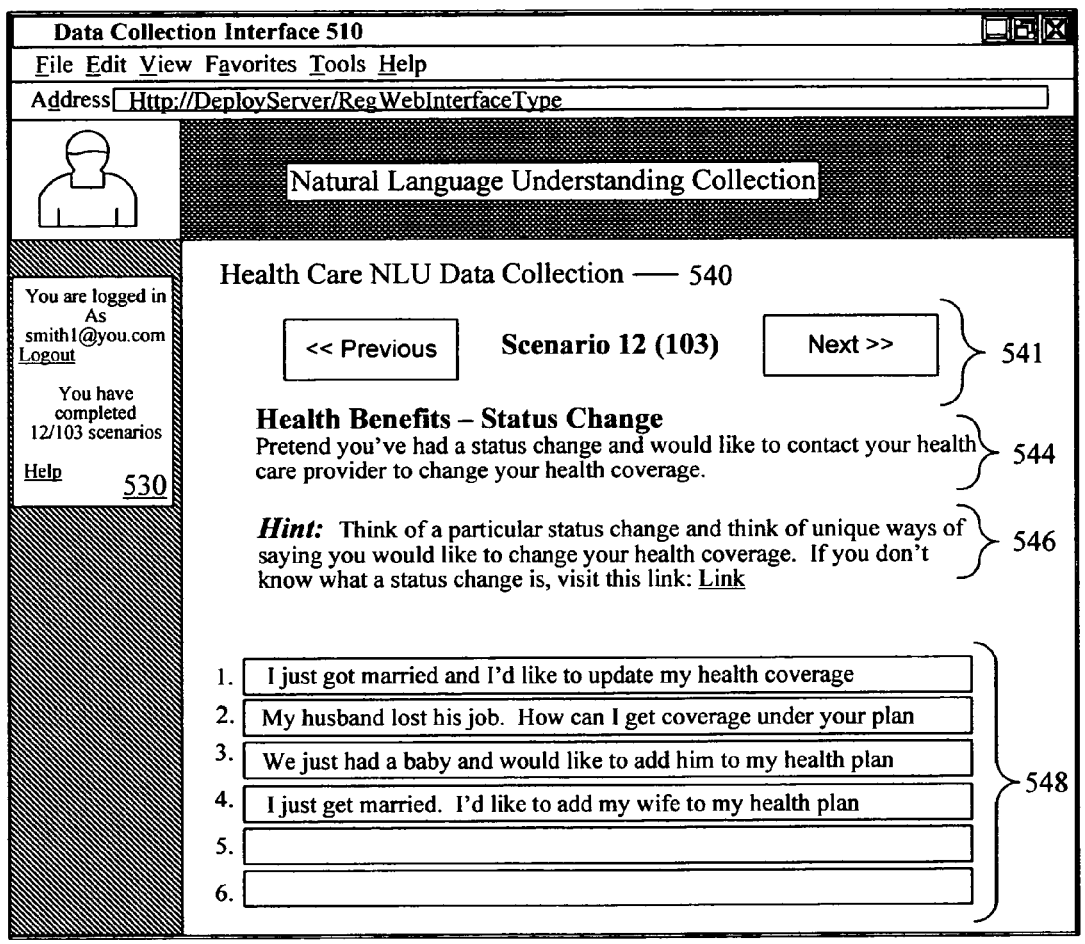
FIG. 5 is an illustrative graphical user interface (GUI) of a regular Web interface type in accordance with an embodiment of the inventive arrangements disclosed herein.

FIG. 5 is an illustrative graphical user interface (GUI) 500 of a regular Web interface type in accordance with an embodiment of the inventive arrangements disclosed herein. GUI 500 can represent a data collection interface 510 generated from a regular Web interface type and designer specified parameters. GUI 500 can be a Web based interface remotely accessible via a Web browser.

GUI 500 can include a log section 530 that can identify a data participant, can allow the data participant to log out, can display the number of completed scenarios, and/or can provide a link for help. A data collection topic 540, such as "Health Care NLU Data Collection," can be included in GUI 500. Additionally, navigation elements 541 can permit a data provider to navigate among different scenarios.

For each scenario, a scenario description 544 can be provided as well as a scenario hint 546. The scenario hint 546 can include one or more hyperlinks that provide help for a data participant. Each scenario can also include one or more scenario responses 548.

It should be appreciated that each of the GUIs 300, 400, and 500 are provided to demonstrate concepts described for an embodiment of the inventive arrangements disclosed herein. The GUIs 300, 400, and/or 500 are not intended to constrain the scope of the invention to a particular contemplated expression. Derivatives of GUIs 300, 400, and 500 including different interface elements, arrangements, layouts, and the like are contemplated herein. Further, the invention is not limited to using graphical interfaces. Voice interfaces, multimodal interfaces, three dimensional interfaces, and the like are contemplated.

Figure 6:
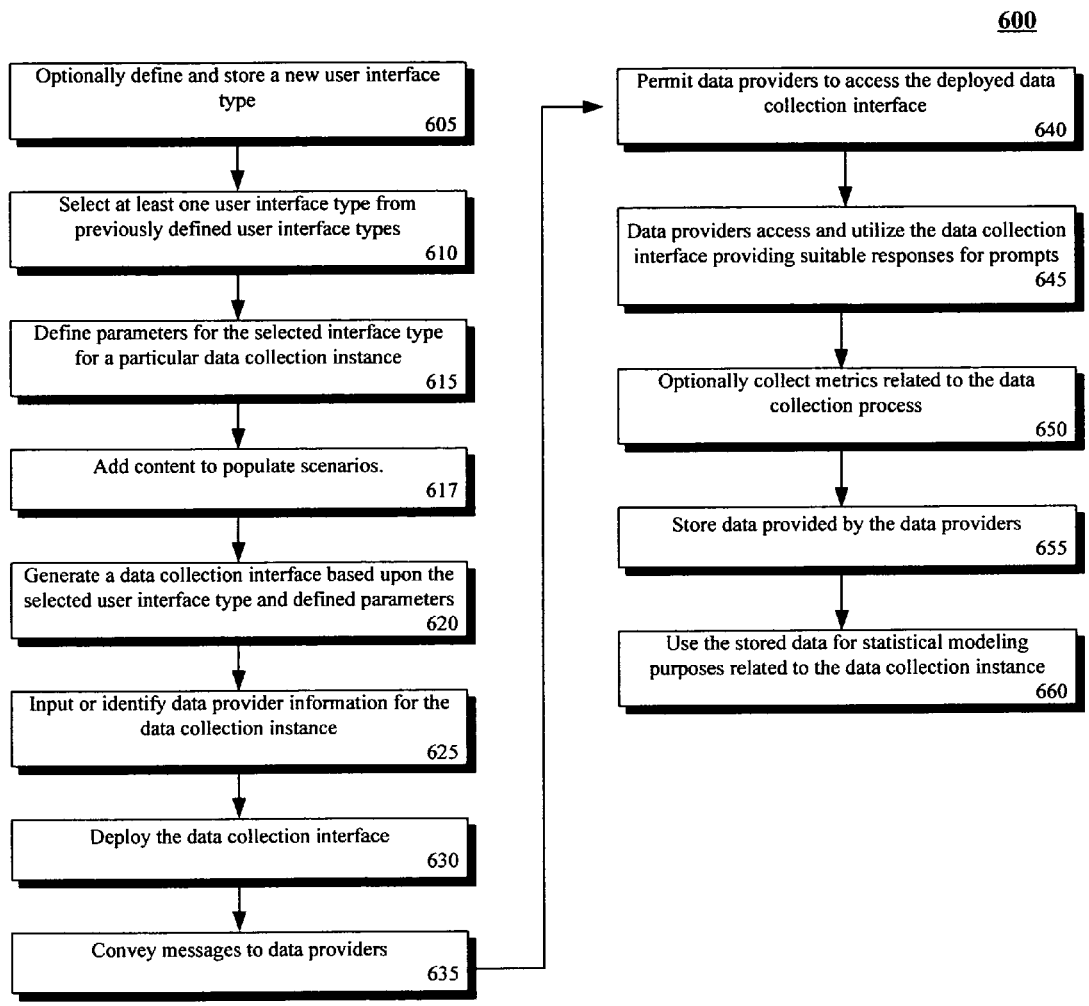
FIG. 6 is a flow chart of a method for collecting data for statistical modeling purposes in accordance with an embodiment of the inventive arrangements disclosed herein.

FIG. 6 is a flow chart of a method 600 for collecting data for statistical modeling purposes in accordance with an embodiment of the inventive arrangements disclosed herein. Method 600 can be performed in the context of a data collection system, such as system 100. It should be understood that method 600 is not to be construed as limited to any particular system and can be performed in the context of any system that includes an interface design application, a means for deploying designed interfaces to respondents, and an analysis mechanism for processing respondent provided data.

Method 600 can begin in either step 605 or step 610 depending on whether a new interface type is to be defined. In optional step 605, an interface designer can define and store a new user interface type. A defined type can be used for any future data collection instance. Accordingly, step 605 provides a mechanism where a designer can extend the infrastructure used to automatically generate data collection interfaces. It is contemplated that third party vendors can design and market data collection interfaces, which data gathering entities can purchase and plug into their data collecting systems.

In step 610, at least one user interface type can be selected from previously defined user interface types. In step 615, the designer can define parameters for the selected interface types for a particular data collection instance. These parameters can adjust the look and feel of the resulting interface, can affect interface runtime behavior, and can define logistical parameters as well as defining input fields of the selected interface type that are customized for the data collection instance. Section 430 from FIG. 4 illustrates a few examples for the parameters of step 615.

In step 617, content can be added to populate the scenarios for the data collection instance. Scenario content can be content for particular prompts or questions, for which a respondent is to provide information. Scenario content can also include content for a topic, data collection instance, and/or a group of scenarios. From FIGS. 3, 4, and 5, items for which scenario data is populated can include items 340, 342, 344, 345, 346, 440, 450, 540, 544, and 546. In order to facilitate populating scenario content for each scenario, each user interface type defines a scenario content form. The scenario form specifies the fields that the content author needs to populate for each scenario. The scenario is rendered using this content along with other parameters that were defined for the user interface.

In step 620, a data collection interface can be automatically generated based upon the selected user interface type, the defined parameters, and the scenario content. In step 625, data provider information can be specified. The data provider input can determine the respondents that are to be presented with the generated interface. In one embodiment, the data providers can be specified by name and contact information, such as a telephone number and e-mail address can be input. In another embodiment, demographics for a target audience can be provided for a data collection effort, and a list of data providers can be automatically determined based upon whether the data providers have matching demographics and are therefore members of the target audience. This latter means for determining data provider participants has the advantage of potentially obscuring the identity of data providers from data collecting agencies, thus assuring respondent anonymity. Additionally, demographic gathering agencies that focus on profiling participants can be utilized by the data collecting agencies, thus reducing overall expenses.

In step 630, the generated data collection interface can be deployed. In step 635, messages can be conveyed to selected data providers informing them of that their participation in a data collection instance is requested. The message can also specify what reward, if any, data providers are to receive for their participation. The message can be provided in any form, such as through an e-mail message, a telephone message, and the like. In step 640, message receiving data providers can access the deployed data collection interface. For example, the data providers can remotely log onto a remote server via a Web browser. A hyperlink or telephone number to access the remote server can be contained within the received message.

In step 645, data providers can access the deployed interface and can provide the requested data in response to the data collection scenarios. Participants can be prompted for one or more input response per scenario as established by the designer of the data collection user interface. In step 650, metrics related to individual usages of the deployed interface can be collected. For example, the time that a data provider takes to respond to each prompt can be recorded. These metrics can be used to weigh responses when analyzing the provided data. In step 655, the collected data can be stored at a previously designated data storage location. This data storage location can be accessible by the data collecting agencies. In step 660, the stored data can be used for statistical modeling purposes related to the data collection instance. For example, the stored data can be data mined for trends and otherwise analyzed and processed to automatically generate statistical models, application test data, and/or data instance reports.

It should be appreciated that the GUI items of FIGS. 3, 4, and 5 are referenced to illustrate possible embodiments for concepts detailed within method 600 and that method 600 is not to be construed as limited to these illustrative embodiments. For example, method 600 can permit a designer to define any of a variety of runtime parameters as defined herein, and is not limited to the parameters shown in section 430 of FIG. 4. In another example, the scenario data of method 600 includes data of any type, kind, and format and is not limited to the types, kinds, and formats illustrated in FIGS. 3, 4, and 5. Similarly, method 600 contemplates any type of interface graphical, audio, multi-modal and otherwise for obtaining and presenting scenario data and is not to be interpreted as limited to the interfaces shown in FIGS. 3, 4, and 5.

Figure 7:
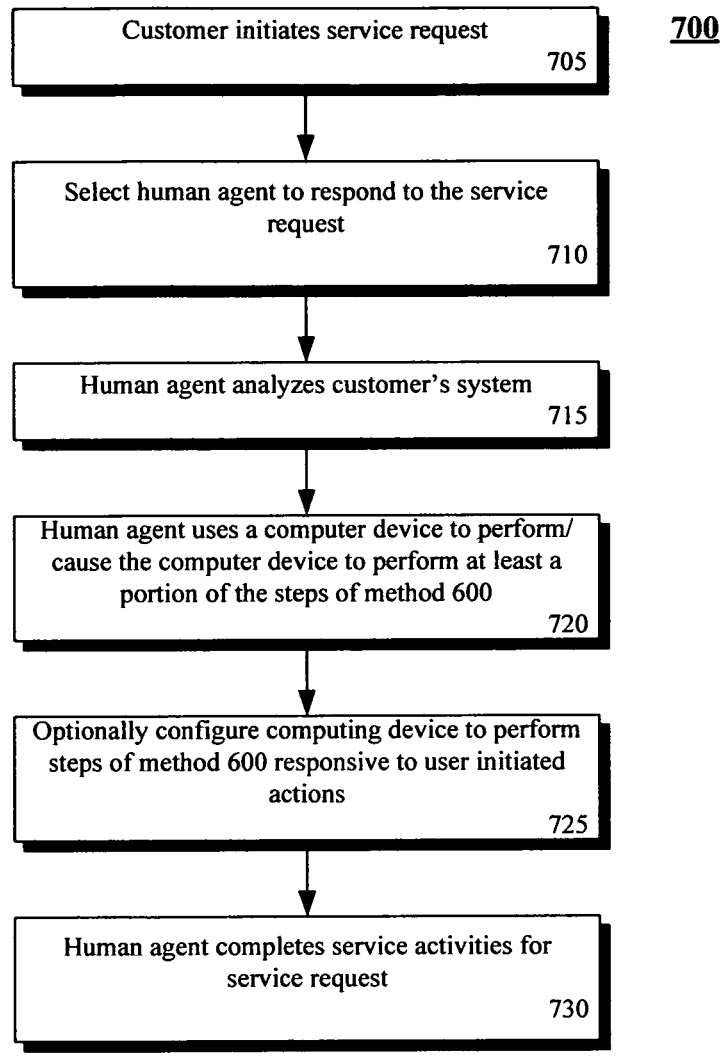
FIG. 7 is a flow chart of a method showing a manner in which a service agent can configure a data collection system or components thereof in response to a service request in accordance with an embodiment of the illustrative arrangements disclosed herein.

FIG. 7 is a flow chart of a method 700 showing a manner in which a service agent can configure a data collection system or components thereof in response to a service request in accordance with an embodiment of the illustrative arrangements disclosed herein. For example, the service agent can configure system 100 for a data collection agency so that the system is capable of performing one or more steps of method 600.

Method 700 can begin in step 705, when a customer initiates a service request. The customer can include a data collecting agency, and a service request can be submitted to an entity that contractually services the data collection system. The service request can be a request to establish a new data collection system as well as a request to service an existing system with which the customer is experiencing problems or for which the customer wishes an upgrade. In step 710, a human agent can be selected by the service agency to respond to the service request. In step 715, the human agent can analyze a customer's needs. In step 720, the human agent can use one or more computing devices to perform or to cause the computer device to perform the steps of method 600 in accordance with the customer's needs.

Appreciably, the one or more computing devices used by the human agent can include the customer's computer, a mobile computing device used by the human agent, a networked computing device, and combinations thereof. The human agent may make adjustments to an interface design server deployment server, a client access device, a data store, and other related computer systems. In optional step 725, the human agent can configure the customer's computer in a manner that the customer or clients of the customer can perform one or more steps of method 600 in the future. For example, the human agent can configure components of a data collection system, so that agents of a data collection agency can perform future data collection actions as disclosed herein. In step 730, the human agent can complete the service activities having resolved the problem for which the service request was submitted.

It should be noted that while the human agent may physically travel to a location local to a system component to adjust or test the component, physical travel may be unnecessary. For example, the human agent can use a remote agent to remotely manipulate the remotely located system component.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. An interface creation system for creating interfaces customized for data collection instances, said system comprising:
    an interface design server configured to automatically generate data collection user interfaces for data collection instances based upon designer provided parameters, wherein each data collection user interfaces is generated from one of a plurality of pre-defined user interface templates corresponding to a plurality of user interface types, wherein said parameters are entered into fields of an interface design application, and wherein said parameters include look and feel parameters, runtime behavior parameters, and logistics parameters;
    a deployment server for serving data collection interfaces generated by the interface design server to a plurality of remotely located data providers over a network connection, wherein the data providers are each sent a message requesting them to participate in the data collection instance as served by the deployment server using the data collection interfaces;
    a data store in which data provided by the data providers is automatically stored by the deployment server, wherein said stored data is automatically analyzed, and wherein said analyzed data is provided to a data collection agent; and
    wherein each of said interface types is integrated with a type specific backend component, wherein said interfaces types include at least one interface type selected from a group consisting of a basic Web interface type, a Web interface type with an embedded Web page, a Web interface type with an uniform resource locator (URL) input field, a speech user interface type, and a multi-modal interface type.

2. The system of claim 1, wherein the data collection interfaces include a plurality of scenarios, each scenario having a scenario description and a plurality of scenario response fields, wherein said data stored in the data store includes input that data providers provided for scenario response fields, wherein said data in said data store is organized and indexed by data collection interface and scenario, and wherein said data store is configured to be integrated with suitable tools for at least one of data processing and modeling.

3. The system of claim 1, wherein the deployment server is provided with target participant data, wherein the deployment server automatically conveys messages to said plurality of remotely located data providers based upon the target participant data.

4. The method of claim 1, wherein each of the deployed data collection interfaces comprises a mechanism for identifying at least one of input errors and input inconsistencies and a mechanism selected from a group of mechanisms consisting of a notification mechanism configured to notify data providers of identified ones of the at least one of input errors and input inconsistencies, a mechanism for automatically correcting identified ones of the input errors, and a mechanism for automatically normalizing identified ones of the input inconsistencies.

5. The system of claim 1, wherein said interface design server comprises an interface creation application, said interface creation application including a graphical user interface (GUI) configured to permit a designer to specify scenario content and to specify parameters for coordinating a data collection instance from interface creation to interface deployment, to data gathering based upon a deployed interface, to data analysis.

* * * * *